United States Patent
Idaka (10) Patent No.: US 12,108,152 B2
(45) Date of Patent: Oct. 1, 2024

(54) APPARATUS, METHOD FOR CONTROLLING THE APPARATUS, AND STORAGE MEDIUM

(71) Applicant: CANON KABUSHIKI KAISHA, Tokyo (JP)

(72) Inventor: Sayuri Idaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 17/933,445

(22) Filed: Sep. 19, 2022

(65) Prior Publication Data
US 2023/0097796 A1    Mar. 30, 2023

(30) Foreign Application Priority Data
Sep. 24, 2021   (JP) .................. 2021-155707

(51) Int. Cl.
*H04N 23/68* (2023.01)
*B64D 47/08* (2006.01)
*H04N 23/695* (2023.01)

(52) U.S. Cl.
CPC ....... *H04N 23/685* (2023.01); *H04N 23/6812* (2023.01); *H04N 23/6815* (2023.01); *H04N 23/695* (2023.01)

(58) Field of Classification Search
CPC ........... H04N 23/6812; H04N 23/6815; H04N 23/685; H04N 23/695; B64D 47/08
See application file for complete search history.

(56) References Cited

U.S. PATENT DOCUMENTS

| | | | | |
|---|---|---|---|---|
| 8,089,527 | B2* | 1/2012 | Tomita | H04N 23/69 348/222.1 |
| 9,667,784 | B2* | 5/2017 | Gintsburg | H04N 23/698 |
| 9,723,209 | B2* | 8/2017 | Takayanagi | H04N 23/687 |
| 11,184,549 | B2* | 11/2021 | Yamaguchi | H04N 23/63 |
| 11,265,475 | B2* | 3/2022 | Takami | H04N 23/69 |
| 11,431,906 | B2* | 8/2022 | Kang | H04N 23/698 |
| 2012/0249866 | A1* | 10/2012 | Aim | H04N 23/66 348/373 |
| 2023/0362472 | A1* | 11/2023 | Wakamatsu | H04N 23/6812 |

FOREIGN PATENT DOCUMENTS

JP    2006080837 A    3/2006

* cited by examiner

*Primary Examiner* — Marly S Camargo
(74) *Attorney, Agent, or Firm* — Canon U.S.A., Inc. IP Division (57) ABSTRACT

An apparatus includes a control unit configured to control a pan drive unit or a tilt drive unit to change a capturing direction of a pickup unit, a detection unit configured to detect shaking to the pickup unit, and a determination unit configured to perform determination processing for determining whether or not a turn angle of the pan drive unit or the tilt drive unit is normal, in which in a case where the detection unit detects the shaking, the control unit executes the control of the pan drive unit or the tilt drive unit based on the detected shaking so that the detected shaking is to be reduced, and the determination unit performs the determination processing according to whether or not the control unit executes the control of the pan drive unit or the tilt drive unit based on the detected shaking.

20 Claims, 7 Drawing Sheets

APPARATUS, METHOD FOR CONTROLLING THE APPARATUS, AND STORAGE MEDIUM

BACKGROUND

Technical Field

The present disclosure relates to an apparatus, a method for controlling the apparatus, and a storage medium.

Description of the Related Art

Japanese Patent Laid-Open No. 2006-80837 discloses a method of performing pan and tilt vibration isolation for a vibration at a frequency that is lower than or equal to a predetermined frequency or a vibration at an amplitude that is larger than or equal to a predetermined amplitude based on a detected vibration.

SUMMARY

An apparatus includes a control unit configured to control a pan drive unit or a tilt drive unit to change a capturing direction of a pickup unit, a detection unit configured to detect shaking to the pickup unit, and a determination unit configured to perform determination processing for determining whether or not a turn angle of the pan drive unit or the tilt drive unit is normal, in which in a case where the detection unit detects the shaking, the control unit executes the control of the pan drive unit or the tilt drive unit based on the detected shaking so that the detected shaking is to be reduced, and the determination unit performs the determination processing according to whether or not the control unit executes the control of the pan drive unit or the tilt drive unit based on the detected shaking.

Further features of the disclosure will become apparent from the following description of exemplary embodiments with reference to the attached drawings.

DESCRIPTION OF THE EMBODIMENTS

Hereinafter, embodiments will be described in detail with reference to the drawings. It is noted that configurations illustrated in the following embodiments are merely examples and are not limited to illustrated configurations.

First Embodiment

Figure 1:
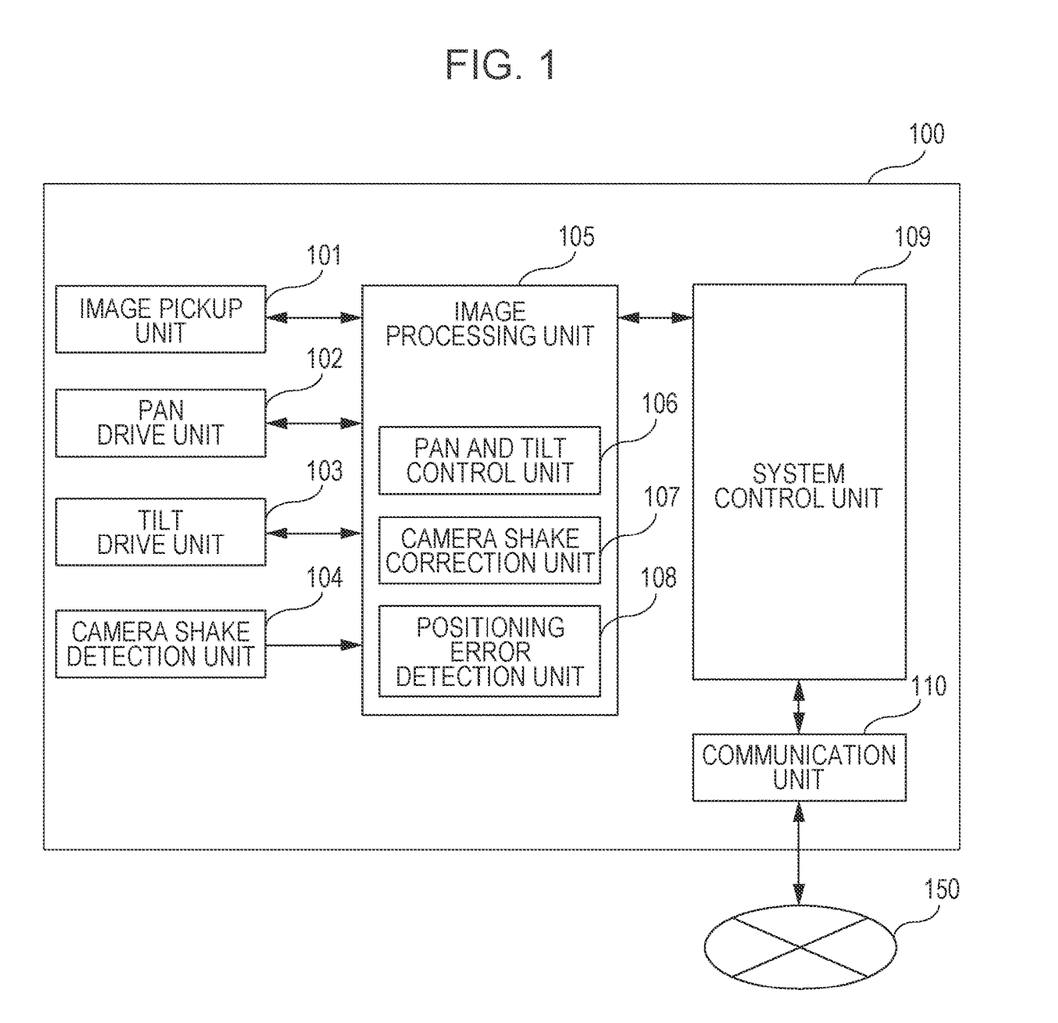
FIG. 1 is a block diagram illustrating a configuration example of an image pickup apparatus.

FIG. 1 is a block diagram illustrating a configuration example of an image pickup apparatus 100 according to a first embodiment. The image pickup apparatus 100 is connected to a client apparatus (information processing apparatus) which is not illustrated in the drawing in a mutually connectable state via a network 150. A user can transmit various commands to the image pickup apparatus 100 from the client apparatus.

The image pickup apparatus 100 has an image pickup unit 101, a pan drive unit 102, a tilt drive unit 103, a camera shake detection unit 104, an image processing unit 105, a system control unit 109, and a communication unit 110. The image processing unit 105 has a pan and tilt control unit 106, a camera shake correction unit 107, and a positioning error detection unit 108. The image pickup apparatus 100 has a mechanism that can turn in a pan direction (horizontal direction) and a tilt direction (vertical direction), and can freely change an image capturing direction or an image capturing viewing angle by a user operation.

The image pickup unit 101 has lenses for image pickup including a focus lens, a zoom lens, and the like, an image pickup element, and a mechanical drive system and a circuit which are configured to drive those components. The image pickup unit 101 is configured to pick up an image of a subject and perform conversion into an electric signal.

The pan drive unit 102 has a mechanical drive system configured to move an orientation of an image capturing direction of the image pickup unit 101 in the pan direction, a motor of a drive source, a motor driver, an encoder configured to detect a position, and the like, and is controlled by the pan and tilt control unit 106. A detailed configuration will be described below with reference to FIG. 2A.

The tilt drive unit 103 has a mechanical drive system configured to move the orientation of the image capturing direction of the image pickup unit 101 in the tilt direction, a motor of a drive source, a motor driver, an encoder configured to detect a position, and the like, and is controlled by the pan and tilt control unit 106. A detailed configuration will be described below with reference to FIG. 2B.

The camera shake detection unit 104 has an angular velocity sensor such as a gyro sensor and various types of filters for noise removal. The camera shake detection unit 104 is configured to detect an angular velocity in a yaw direction and a pitch direction of the image pickup unit 101. The angular velocity sensor is arranged on the image pickup unit 101 to detect the yaw direction and the pitch direction of the image pickup unit 101. For the angular velocity sensor, one each of an angular velocity sensor for the detection in the yaw direction and an angular velocity sensor for the detection in the pitch direction may also be arranged, or a single angular velocity sensor enabling two-axis or three-axis detections at the same time may also be arranged. In addition, a single sensor enabling six-axis detections in which the angular velocity sensor and an acceleration sensor are integrated with each other may also be arranged. The camera shake correction unit 107 is configured to obtain angular velocity information detected by the camera shake detection unit 104, and perform blurry image correction of the image pickup unit 101.

The image processing unit 105 is configured to perform image processing such as noise removal or gamma correction on the electric signal converted by the image pickup unit 101 to generate image data, and pass the image data to the system control unit 109. In addition, the image processing unit 105 is configured to perform processing on a command received from the system control unit 109. For example, in a case where an instruction for changing a zoom position or changing a focus position is received from the system control unit 109, the image processing unit 105 drives the focus lens or the zoom lens of the image pickup unit 101 to the position indicated by the received instruction. In addition, in a case where an instruction for adjusting an image quality is received from the system control unit 109, the image processing unit 105 performs an adjustment of the image quality. The image processing unit 105 has the pan and tilt control unit 106, the camera shake correction unit 107, and the positioning error detection unit 108.

The pan and tilt control unit 106 is configured to perform processing on a command related to pan and tilt control which has been received from the system control unit 109, and perform control on a drive amount, a speed, and acceleration and deceleration of the pan drive unit 102 and the tilt drive unit 103, an initialization processing, and the like based on an instruction of the command.

The camera shake correction unit 107 is configured to convert the angular velocity information obtained from the camera shake detection unit 104 into angle information, and perform camera shake correction of the image pickup unit 101 by driving the pan drive unit 102 and the tilt drive unit 103 based on the converted angle information. The camera shake correction according to the present embodiment is pan and tilt vibration isolation using the pan drive unit 102 and the tilt drive unit 103, but is not limited to this. For the camera shake correction, an electronic camera shake correction unit configured to correct a camera shake amount by shifting pixels of an image pickup sensor and an optical camera shake correction unit configured to perform correction by moving a correction optical system lens included in the image pickup unit 101 may be also used in combination.

The positioning error detection unit 108 is configured to perform an error detection in a case where the pan drive unit 102 and the tilt drive unit 103 are moved by external force by a hand or the like instead of the motor or a case where the drive to a target position has failed due to an obstacle or the like. The positioning error detection unit 108 performs the error detection by comparing a pulse number of a managed motor with an encoder value with which an actual position of the drive unit can be obtained. For example, the positioning error detection unit 108 determines a positioning error in a case where a difference between the pulse number of the motor and the encoder value is larger than or equal to a first threshold and also a state of being larger than or equal to the first threshold has continued for a period of time that is longer than or equal to a second threshold. In a case where the positioning error is determined, to indicate that positioning error has occurred, the image processing unit 105 causes a light emitting device (LED) which is not illustrated in the drawing to blink, and does not accept a drive command of the pan drive unit 102 and the tilt drive unit 103. According to the present embodiment, a specification has been adopted where the drive command of the pan drive unit 102 and the tilt drive unit 103 is not to be accepted, but the specification is not limited to this. Even after the positioning error is determined, the image processing unit 105 may continue accepting the drive command as it is, or a configuration may also be adopted where the pan drive unit 102 and the tilt drive unit 103 are to be initialized. In addition, according to the present embodiment, the positioning error detection unit 108 has the first threshold and the second threshold, but a single threshold may be used, or another threshold may also be added.

The system control unit 109 is configured to control an entirety of the image pickup apparatus 100. The system control unit 109 distributes the generated image data to the client apparatus which is not illustrated in the drawing via the communication unit 110. In addition, the system control unit 109 analyzes a camera control command passed by the communication unit 110, and passes a command related to the image processing unit 105 to the image processing unit 105. For example, in a case where a command for a standby state is received, the system control unit 109 issues an instruction for entering the standby state to the image processing unit 105. In a case where a return instruction command is received from the standby state, the system control unit 109 issues an instruction for returning from the standby state to the image processing unit 105.

The communication unit 110 is configured to receive a camera control command transmitted from the client apparatus, and pass the camera control command to the system control unit 109. In addition, the communication unit 110 transmits a response to the camera control command to the client apparatus which is not illustrated in the drawing.

It is noted that the image pickup apparatus 100 according to the present embodiment is not limited to the configuration illustrated in FIG. 1. For example, the image pickup apparatus 100 may also be provided with a video image output terminal such as a serial digital interface (SDI), an audio input and output unit, or an external device input and output unit.

In addition, the communication unit 110 may adopt a wired connection or a wireless connection. In addition, the image pickup apparatus 100 may adopt a configuration in which the communication unit 110 is connected to other equipment through a serial communication or the like instead of a configuration of being connected to the network 150.

Figure 2A:
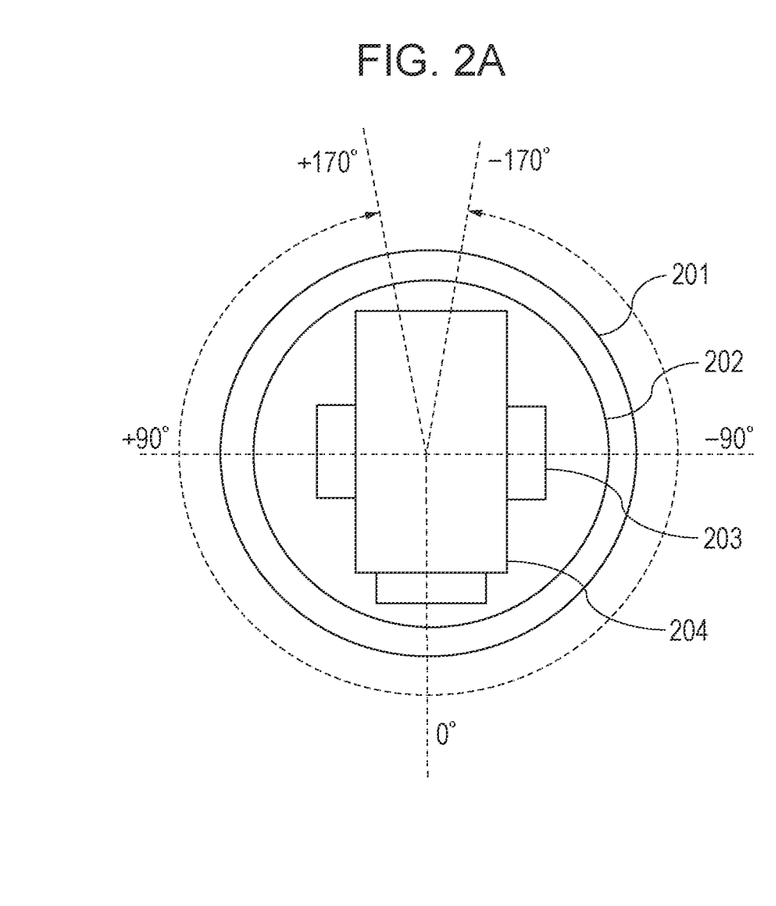
FIGS. 2A and 2B illustrate external appearance examples of the image pickup apparatus.
Figure 2B:
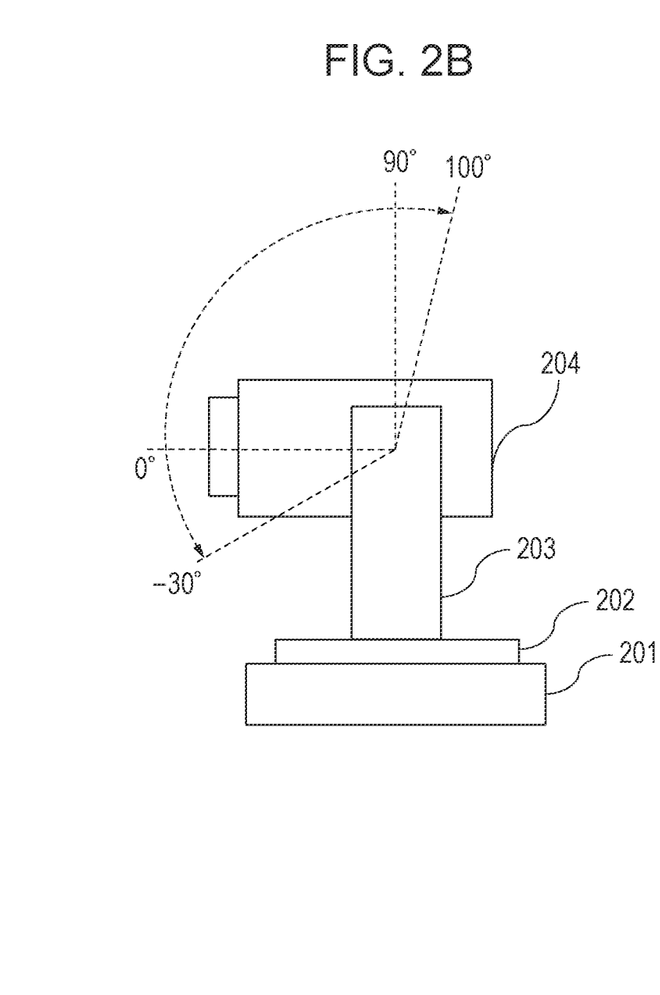

FIGS. 2A and 2B illustrate external appearance examples of the image pickup apparatus 100 according to the present embodiment. FIG. 2A is a view of the image pickup apparatus 100 from a top side. FIG. 2B is a view of the image pickup apparatus 100 from a side face. The image pickup apparatus 100 has a bottom case 201, a turntable 202, a camera head supporting pillar 203, and a camera head 204.

With reference to FIGS. 2A and 2B, while an axis in an up-and-down direction is defined as a vertical axis and an axis orthogonal to the vertical axis is defined as a horizontal axis, an operation of a pan and tilt movable portion will be described. In FIG. 2A, while a vertical axis perpendicular to a paper surface is set as a center, a clockwise direction is set as a positive direction of a panning angle, and an anticlockwise direction is set as a negative direction of the panning angle. In FIG. 2B, while an axis perpendicular to the paper surface is set as a center, a clockwise direction is set as a positive direction of a tilting angle, and an anticlockwise direction is set as a negative direction of the tilting angle.

The pan drive unit 102 has the bottom case 201 and the turntable 202. The turntable 202 turns in the horizontal direction about the vertical axis. The pan drive unit 102 of the present embodiment can turn in the pan direction from −170 degrees to +170 degrees.

The tilt drive unit 103 has the camera head supporting pillar 203 provided on the turntable 202, and the camera head 204. The camera head 204 turns in the vertical direction about the horizontal axis. The tilt drive unit 103 of the present embodiment can turn in the tilt direction from −30 degrees to 100 degrees.

In this manner, the image pickup apparatus 100 of the present embodiment can perform image capturing in a wide range by changing the image capturing direction when the camera head 204 is turned in the horizontal direction and the vertical direction. It is noted that the image pickup apparatus 100 of the present embodiment is not limited to the configurations illustrated in FIGS. 2A and 2B. For example, a configuration may also be adopted where the image pickup apparatus 100 can be endlessly driven by 360 degrees in the pan direction, or a configuration may also be adopted where the image pickup apparatus 100 can be driven by 180 degrees in the tilt direction.

Figure 3A:
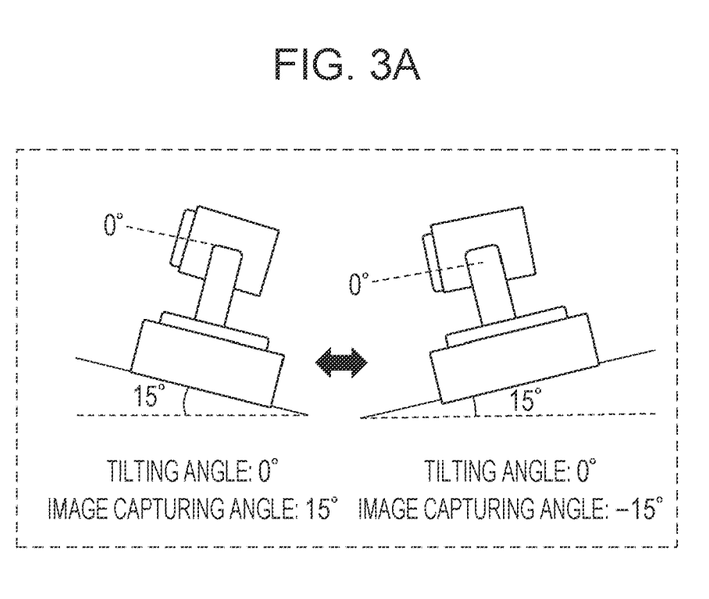
FIGS. 3A and 3B illustrate vibration isolation control.
Figure 3B:
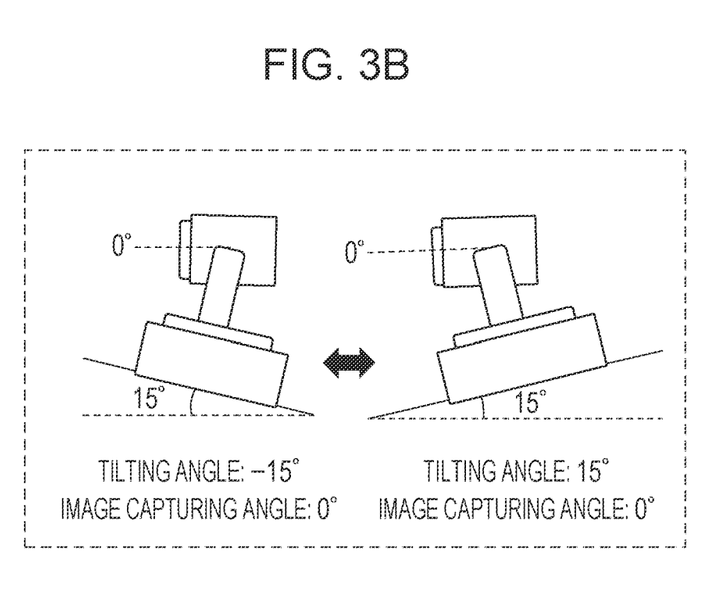

FIGS. 3A and 3B illustrate a situation in which the image pickup apparatus 100 performs vibration isolation control using the tilt drive unit 103. FIG. 3A illustrates a state where a pan and tilt (PT) vibration isolation control function is off. FIG. 3B illustrates a state where the PT vibration isolation function is on. According to the present embodiment, the image pickup apparatus 100 performs the vibration isolation control using the tilt drive unit 103 since the vibration isolation control in the tilt direction is performed, but the configuration is not limited to this. To perform the vibration isolation control in the pan direction, the image pickup apparatus 100 may also perform the vibration isolation control using the pan drive unit 102, or may also perform the vibration isolation control in both axes in the pan direction and the tilt direction.

FIGS. 3A and 3B illustrate a situation where the image pickup apparatus 100 is attached to a stand or the like, and the stand to which the image pickup apparatus 100 is attached shaken in the tilt direction by ±15°. For example, in a case where the image pickup apparatus 100 is attached to a boat or the like, since the boat is seriously shaken by waves, the attached stand is also seriously shaken. To capture an image of a surrounding of the boat, the camera head 204 is positioned at 0° in the horizontal direction. However, in a state where the PT vibration isolation function is off in FIG. 3A, due to the shaking of the boat, it is difficult for the image pickup apparatus 100 to capture a position at 0° which the user desires to capture. Thus, a video image having a camera shake from −15° to 15° as the image capturing direction is captured, and it is very hard to watch the video image.

In view of the above, when the PT vibration isolation function is turned on, the image pickup apparatus 100 controls the tilt drive unit 103 in a range from −15° to 15° to correct the camera shake in accordance with an output result by the camera shake correction unit 107. As a result, as in FIG. 3B, the image pickup apparatus 100 can regularly capture the position at 0° in the horizontal direction. In this manner, the large shaking can also be corrected by the PT vibration isolation since the drive ranges of the pan drive unit 102 and the tilt drive unit 103 are wide, and even in a case where the image pickup apparatus 100 is installed on a boat or the like which is to be seriously shaken, it is possible to provide a video image having little camera shake to the user.

Figure 4:
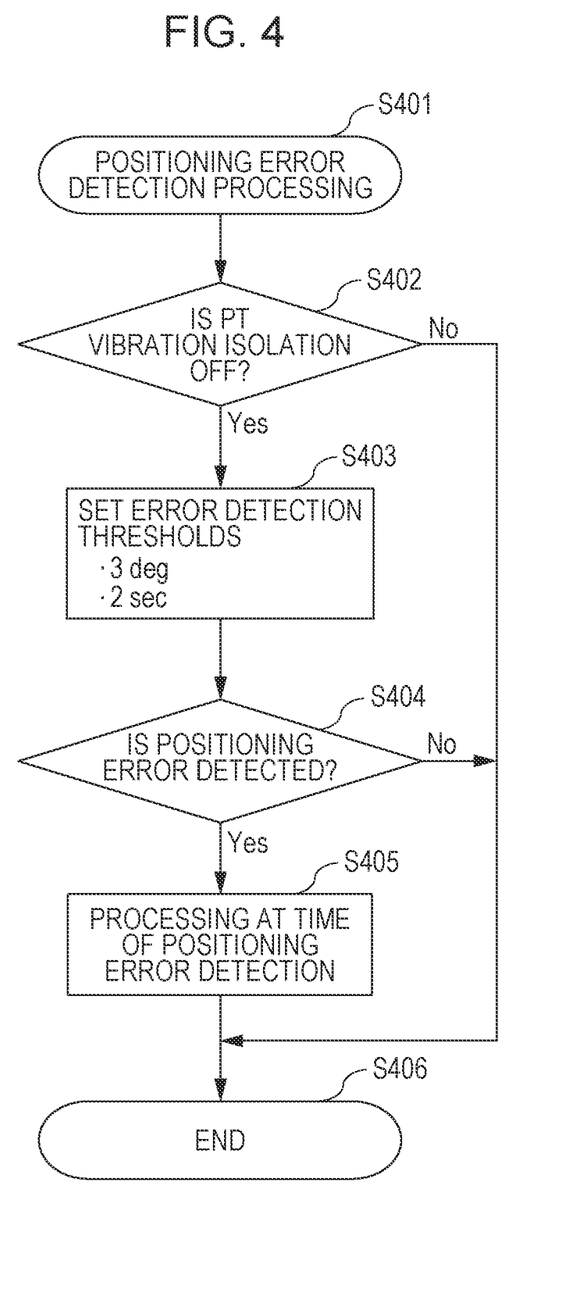
FIG. 4 is a flowchart illustrating processing of a positioning error detection unit.

FIG. 4 is a flowchart illustrating a processing example of the positioning error detection unit 108 according to the present embodiment. The positioning error detection unit 108 performs the processing of FIG. 4 periodically (for example, 60 Hz). Hereinafter, a control method of the image pickup apparatus 100 will be described.

In step S401, the positioning error detection unit 108 starts a sequence of FIG. 4. In step S402, the positioning error detection unit 108 obtains a state as to whether the PT vibration isolation function is on or off. According to the present embodiment, a specification is adopted where the user can set on/off of the PT vibration isolation function. By obtaining a setting value of the PT vibration isolation function, the positioning error detection unit 108 can obtain the state of the PT vibration isolation function. When the PT vibration isolation function is off, the positioning error detection unit 108 proceeds to step S403, and when the PT vibration isolation function is on, the positioning error detection unit 108 proceeds to step S406.

In step S403, the positioning error detection unit 108 sets thresholds. According to the present embodiment, the positioning error detection unit 108 sets a first threshold and a second threshold. The first threshold is a threshold of a position where a difference between the number of motor pulses and an encoder value are compared with each other. The second threshold is a threshold for comparing whether or not the difference that is larger than or equal to the first threshold has continued for a predetermined period of time or longer. According to the present embodiment, the positioning error detection unit 108 sets the first threshold at 3 degrees, and sets the second threshold at 2 seconds. In a case where these values are set, for example, the positioning error detection unit 108 determines the positioning error two seconds after the pan drive unit 102 or the tilt drive unit is turned by a hand or the like by 3 degrees or more.

Thereafter, the processing proceeds to step S404.

In step S404, the positioning error detection unit 108 determines whether or not the positioning error is detected using the first threshold and the second threshold. For example, the positioning error detection unit 108 determines that the positioning error is detected in a case where the difference between the number of motor pulses and the encoder value is larger than the first threshold and also this state has continued for a period of time that is longer than or equal to the second threshold. In a case where it is determined that the positioning error is detected, the positioning error detection unit 108 proceeds to step S405, and in a case where it is determined that the positioning error is not detected, the positioning error detection unit 108 proceeds to step S406.

In step S405, the positioning error detection unit 108 performs processing at the time of the positioning error detection.

According to the present embodiment, the positioning error detection unit 108 causes the LED to blink to inform the user of the occurrence of the positioning error. In addition, in a case where the positioning error occurs, a state is established in which the position of the managed drive unit and the actual position of the drive unit are deviated from each other, and it is difficult to perform the drive to an accurate position. For this reason, in this case, the image processing unit 105 does not execute commands other than an initialization processing command to the pan drive unit 102 or the tilt drive unit 103. Thereafter, the processing proceeds to step S406.

In step S406, the positioning error detection unit 108 ends the sequence of FIG. 4.

As described above, according to the first embodiment, in a case where the PT vibration isolation function is off, the positioning error detection unit 108 performs the positioning error detection processing, and in a case where the PT vibration isolation function is on, the positioning error detection unit 108 does not perform the positioning error detection processing. Since the positioning error detection unit 108 does not perform the positioning error detection processing when the PT vibration isolation function is on, an erroneous detection of the positioning error detection unit 108 can be avoided when the PT vibration isolation function is on.

As described above, the pan and tilt control unit 106 performs the control for driving the image pickup unit 101 in the pan direction or the tilt direction. In a case where the correction function is enabled (on), the camera shake correction unit 107 corrects the shaking of the image pickup unit 101 by the control of the pan and tilt control unit 106 according to the shaking of the image pickup unit 101. The above described correction function is the PT vibration isolation function. The shaking of the image pickup unit 101 is the camera shake of the image pickup unit 101.

The positioning error detection unit 108 detects a displacement in the pan direction or the tilt direction of the image pickup unit 101. The displacement is, for example, a positioning error. The positioning error detection unit 108 detects the displacement between the position in the pan direction or the tilt direction of the image pickup unit 101 controlled by the pan and tilt control unit 106 and the actual position in the pan direction or the tilt direction of the image pickup unit 101.

The positioning error detection unit 108 obtains a difference between the position in the pan direction or the tilt direction of the image pickup unit 101 controlled by the pan and tilt control unit 106 and the actual position in the pan direction or the tilt direction of the image pickup unit 101. In a case where a state in which the difference is larger than or equal to the first threshold has continued for a period of time longer than or equal to the second threshold, the positioning error detection unit 108 then detects the positioning error.

The positioning error detection unit 108 performs different processes according to an enabled state (on) or a disabled state (off) of the correction function of the camera shake correction unit 107. Specifically, the positioning error detection unit 108 detects the displacement in a case where the correction function of the camera shake correction unit 107 is disabled, and does not perform the displacement in a case where the correction function of the camera shake correction unit 107 is enabled.

In step S405, the positioning error detection unit 108 reports the positioning error by blinking of the LED or the like in a case where the positioning error is detected, for example.

According to the present embodiment, the positioning error detection unit 108 can avoid an erroneous detection of the positioning error in a case where the PT vibration isolation function is on.

Second Embodiment

Figure 5:
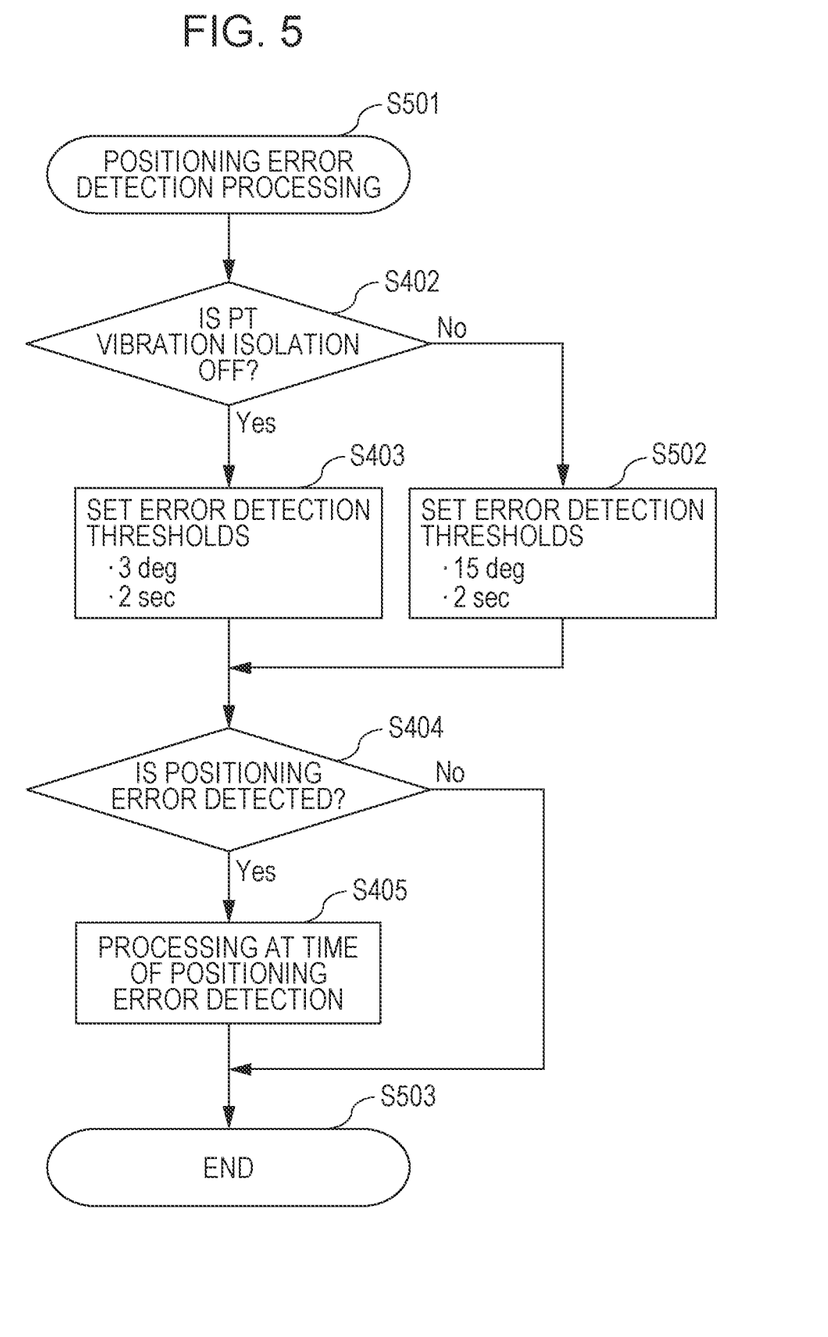
FIG. 5 is a flowchart illustrating the processing of the positioning error detection unit.

FIG. 5 is a flowchart illustrating a processing example of the positioning error detection unit 108 according to a second embodiment. In FIG. 5, steps S401 and S406 are deleted from FIG. 4, and steps S501 to S503 are added to FIG. 4. Hereinafter, a different aspect of the present embodiment from the first embodiment will be described. According to the first embodiment, the positioning error detection unit 108 does not perform the positioning error detection when the PT vibration isolation function is on. According to the second embodiment, the positioning error detection unit 108 performs the positioning error detection also when the PT vibration isolation function is on.

In step S501, the positioning error detection unit 108 starts a sequence of FIG. 5. In step S402, in a case where the PT vibration isolation function is off, the flow proceeds to step S403, and in a case where the PT vibration isolation function is on, the flow proceeds to step S502.

In step S403, similarly as in FIG. 4, the positioning error detection unit 108 sets the first threshold and the second threshold in a case where the PT vibration isolation function is off. For example, the positioning error detection unit 108 sets the first threshold at 3 degrees, and sets the second threshold at 2 seconds. Thereafter, the processing proceeds to step S404.

In step S502, the positioning error detection unit 108 sets the first threshold and the second threshold in a case where the PT vibration isolation function is on. For example, the positioning error detection unit 108 sets the first threshold at 15 degrees, and sets the second threshold at 2 seconds. Thereafter, the processing proceeds to step S404.

The first threshold (15 degrees) in a case where the PT vibration isolation function is on is larger than the first threshold (3 degrees) in a case where the PT vibration isolation function is off. A reason thereof is that in a case where the PT vibration isolation function is on, the camera shake correction unit 107 drives the pan drive unit 102 or the tilt drive unit 103 to correct the camera shake, but it is difficult to completely correct the camera shake, and the uncorrected camera shake may remain. For example, in a case where there is a camera shake at ±20 degrees, when 80% of the camera shake is correctable, the remaining 20% is not correctable, and the camera shake remains. Since 20% of ±20 degrees becomes ±4 degrees, an uncorrected camera shake at a maximum of 8 degrees remains. Thus, the error is determined at the first threshold (3 degrees) set in step S403 despite a state in which the movement is not conducted by a hand or the like. For this reason, the first threshold (15 degrees) in a case where the PT vibration isolation function is on is larger than the first threshold (3 degrees) in a case where the PT vibration isolation function is off while a case is also taken into account where the uncorrectable camera shake remains.

In step S404, in a case where it is determined that the positioning error is detected, the positioning error detection unit 108 proceeds to step S405, and in a case where it is determined that the positioning error is not detected, the positioning error detection unit 108 proceeds to step S503.

In step S405, the positioning error detection unit 108 performs the processing at the time of the positioning error detection similarly as in FIG. 4, and proceeds to step S503.

In step S503, the positioning error detection unit 108 ends the sequence of FIG. 5.

As described above, according to the second embodiment, the positioning error detection unit 108 sets the different first thresholds in a case where the PT vibration isolation function is on and a case where the PT vibration isolation function is off. In this manner, the positioning error detection unit 108 enables the positioning error detection even in a case where the PT vibration isolation function is on, and also can avoid the erroneous detection.

It is noted that the positioning error detection unit 108 sets the different first thresholds in a case where the PT vibration isolation function is on and a case where the PT vibration isolation function is off, but may set both the different first thresholds and different second thresholds.

As described above, the positioning error detection unit 108 changes the first threshold or the second threshold in a case where the PT vibration isolation function is on and a case where the PT vibration isolation function is off. The first threshold (15 degrees) in a case where the PT vibration isolation function is on is larger than the first threshold (3 degrees) in a case where the PT vibration isolation function is off.

According to the present embodiment, the positioning error detection unit 108 can avoid the erroneous detection of the positioning error while the detection of the positioning error is performed in a case where the PT vibration isolation function is on, and also.

Third Embodiment

Figure 6:
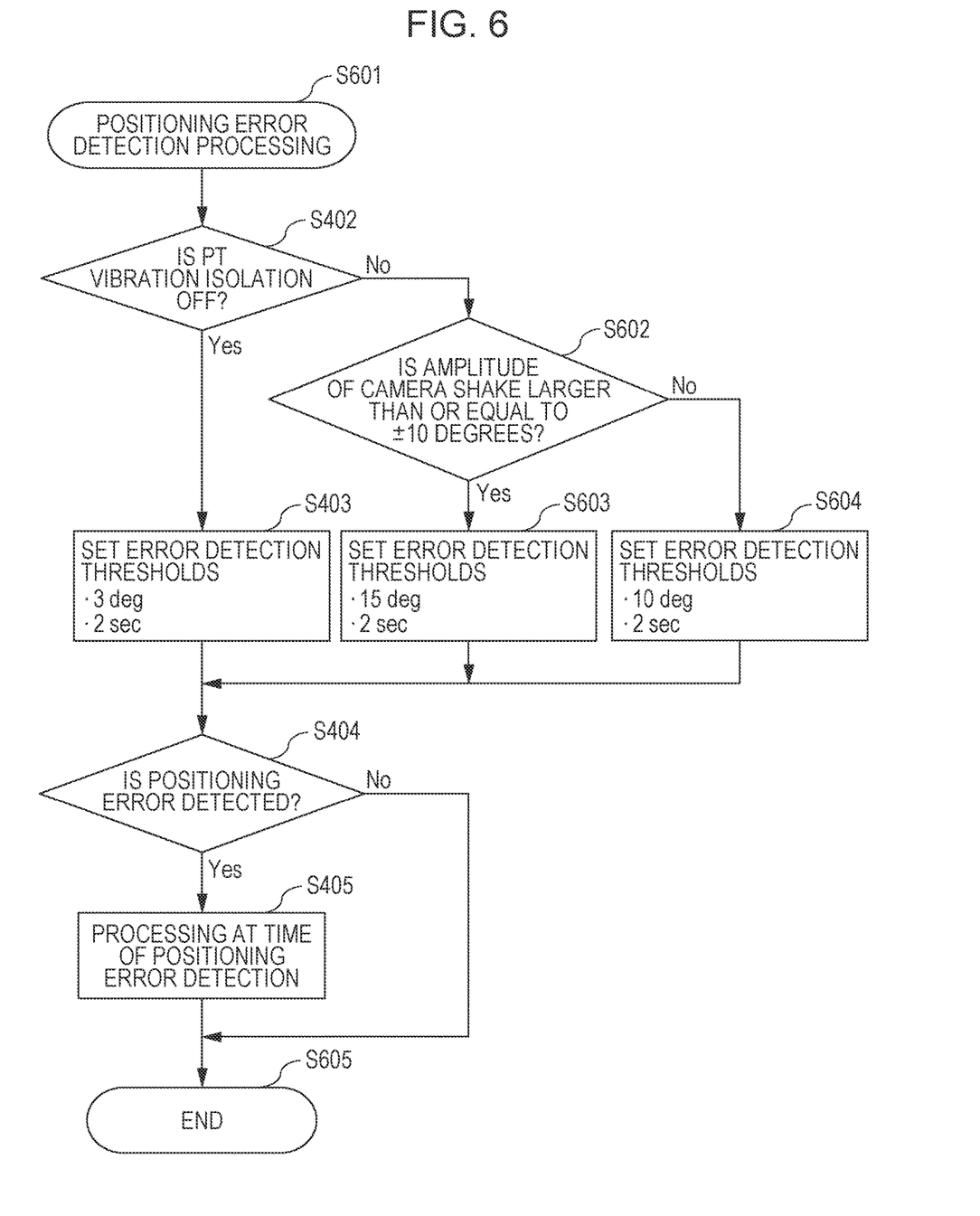
FIG. 6 is a flowchart illustrating the processing of the positioning error detection unit.

FIG. 6 is a flow chart illustrating a processing example of the positioning error detection unit 108 according to a third embodiment. In FIG. 6, steps S401 and S406 are deleted from FIG. 4, and steps S601 to S605 are added to FIG. 4. Hereinafter, different aspects of the present embodiment from the first and second embodiments will be described. According to the second embodiment, the positioning error detection unit 108 sets the different first thresholds in a case where the PT vibration isolation function is on and a case where the PT vibration isolation function is off. According to the third embodiment, the positioning error detection unit 108 changes the first threshold further according to a magnitude of an amplitude of the camera shake in a case where the PT vibration isolation function is on.

In step S601, the positioning error detection unit 108 starts a sequence of FIG. 6. In step S402, in a case where the PT vibration isolation function is off, the flowchart proceeds to step S403, and in a case where the PT vibration isolation function is on, the flowchart proceeds to step S602.

In step S403, the positioning error detection unit 108 sets the first threshold and the second threshold in a case where the PT vibration isolation function is off similarly as in FIG. 4. For example, the positioning error detection unit 108 sets the first threshold at 3 degrees, and sets the second threshold at 2 seconds. Thereafter, the processing proceeds to step S404.

In step S602, the positioning error detection unit 108 obtains a current amplitude of the camera shake from the angular velocity information detected by the camera shake detection unit 104, and it is determined whether or not an absolute value of the current amplitude of the camera shake is higher than or equal to 10 degrees. In a case where the absolute value of the current amplitude of the camera shake is higher than or equal to 10 degrees, the positioning error detection unit 108 proceeds to step S603, and in a case where the absolute value of the current amplitude of the camera shake is lower than 10 degrees, the positioning error detection unit 108 proceeds to step S604.

It is noted that the positioning error detection unit 108 can obtain an amplitude of the camera shake from a gyro of the camera shake detection unit 104, but the configuration is not limited to this. The positioning error detection unit 108 may obtain the amplitude of the camera shake from a value of the encoder of the pan drive unit 102 or the tilt drive unit 103 when the PT vibration isolation function is on.

In step S603, the positioning error detection unit 108 sets the first threshold and the second threshold in a case where the PT vibration isolation function is on and also an absolute value of the amplitude of the camera shake is higher than or equal to 10 degrees. For example, the positioning error detection unit 108 sets the first threshold at 15 degrees, and sets the second threshold at 2 seconds. Thereafter, the processing proceeds to step S404.

In step S604, the positioning error detection unit 108 sets the first threshold and the second threshold in a case where the PT vibration isolation function is on and also the absolute value of the amplitude of the camera shake is lower than 10 degrees. For example, the positioning error detection unit 108 sets the first threshold at 10 degrees, and sets the second threshold at 2 seconds. Thereafter, the processing proceeds to step S404.

In step S404, in a case where it is determined that the positioning error is detected, the positioning error detection unit 108 proceeds to step S405, and in a case where it is determined that the positioning error is not detected, the positioning error detection unit 108 proceeds to step S605.

In step S405, the positioning error detection unit 108 performs the processing at the time of the positioning error detection similarly as in FIG. 4, and proceeds to step S605.

In step S605, the positioning error detection unit 108 ends the sequence of FIG. 6.

As described above, according to the third embodiment, the positioning error detection unit 108 changes the first threshold according to the amplitude of the camera shake in a case where the PT vibration isolation function is on. In this manner, the positioning error detection unit 108 avoids the erroneous detection of the positioning error, and can more accurately perform the positioning error detection even in the case of being moved by a hand or the like.

It is noted that the positioning error detection unit 108 sets the first threshold and the second threshold according to the amplitude of the camera shake, but the configuration is not limited to this. The positioning error detection unit 108 may also set the first threshold and the second threshold according to a frequency of the camera shake. In general, the camera shake is not to be fully corrected as the frequency of the camera shake is higher, and it is more likely that the camera shake remains. For this reason, the positioning error detection unit 108 can set the first threshold to be larger as the frequency of the camera shake is higher, for example.

As described above, the positioning error detection unit 108 changes the first threshold according to the amplitude of the shaking of the image pickup unit 101 in a case where the PT vibration isolation function is on. The first threshold is larger as the amplitude of the shaking of the image pickup unit 101 is larger.

In addition, the positioning error detection unit 108 may also change the first threshold according to the frequency of the shaking of the image pickup unit 101 in a case where the PT vibration isolation function is on. The first threshold is larger as the frequency of the shaking of the image pickup unit 101 is higher.

According to the present embodiment, in a case where the PT vibration isolation function is on, the positioning error detection unit 108 can avoid an erroneous detection of the positioning error while the detection of the positioning error is accurately performed.

Figure 7:
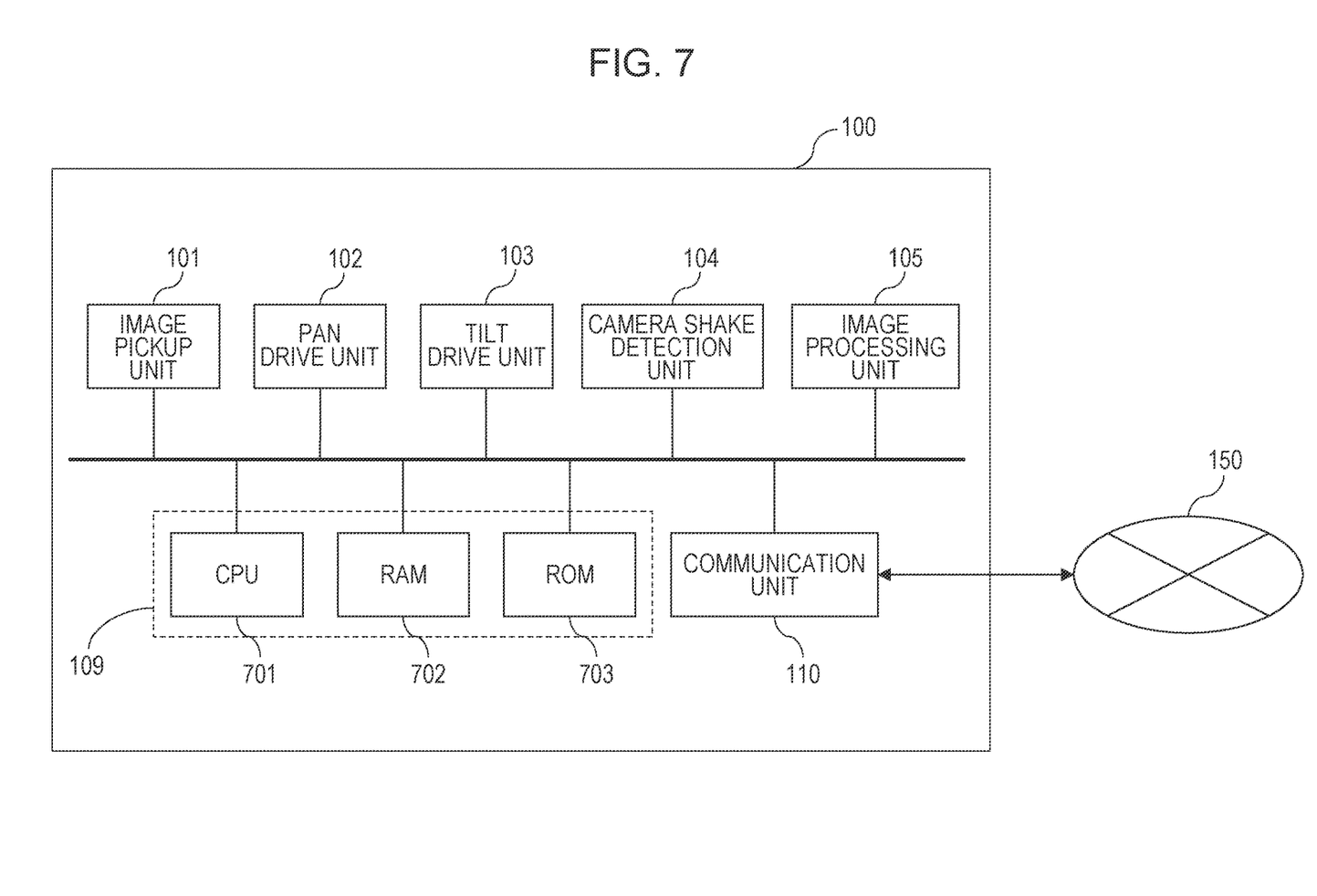
FIG. 7 illustrates a hardware configuration of the image pickup apparatus.

With regard to a hardware configuration of the image pickup apparatus according to the first to third embodiments FIG. 7 illustrates a hardware configuration of the image pickup apparatus according to the first to third embodiments. The image pickup apparatus 100 is configured by the image pickup unit 101, the pan drive unit 102, the tilt drive unit 103, the camera shake detection unit 104, the image processing unit 105, the system control unit 109, and the communication unit 110. The system control unit 109 is configured by a central processing unit (CPU) 701, a random access memory (RAM) 702, and a read only memory (ROM) 703. Since the image pickup unit 101, the pan drive unit 102, the tilt drive unit 103, the camera shake detection unit 104, the image processing unit 105, and the communication unit 110 among the respective units configuring the image pickup apparatus have been described in the first to third embodiments, descriptions thereof will be omitted herein.

The CPU 701 is a processor configured to actually perform a control command from the system control unit 109 or internal processing. Each of operation to be executed by software of the image pickup apparatus according to the first to third embodiments are executed when the CPU 701 loads programs stored in the ROM 703 or an auxiliary storage device. The RAM 702 is a volatile memory used as a work space for performing operation processing in the CPU 701 or as a temporary storage device.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-155707, filed Sep. 24, 2021, which is hereby incorporated by reference herein in its entirety.

What is claimed is:

1. An apparatus comprising:
a control unit configured to control a pan drive unit or a tilt drive unit to change a capturing direction of a pickup unit;
a detection unit configured to detect shaking to the pickup unit; and
a determination unit configured to perform determination processing for determining whether or not a turn angle of the pan drive unit or the tilt drive unit is normal, wherein
in a case where the detection unit detects the shaking, the control unit executes the control of the pan drive unit or the tilt drive unit based on the detected shaking so that the detected shaking is to be reduced, and
the determination unit performs the determination processing according to whether or not the control unit executes the control of the pan drive unit or the tilt drive unit based on the detected shaking.

2. The apparatus according to claim 1, wherein the determination unit performs the determination processing in a case where the control unit does not execute the control of the pan drive unit or the tilt drive unit based on the detected shaking.

3. The apparatus according to claim 1, wherein the determination unit executes the determination processing using different thresholds according to whether or not the control unit executes the control of the pan drive unit or the tilt drive unit based on the detected shaking.

4. The apparatus according to claim 3, wherein a threshold in a case where the control unit executes the control of the pan drive unit or the tilt drive unit based on the detected shaking is larger than a threshold in a case where the control unit does not execute the control of the pan drive unit or the tilt drive unit based on the detected shaking.

5. The apparatus according to claim 3, wherein the determination unit performs the determination processing using different thresholds according to an amplitude of the detected shaking in a case where the control unit executes the control of the pan drive unit or the tilt drive unit based on the detected shaking.

6. The apparatus according to claim 5, wherein the determination unit performs the determination processing using a larger threshold as the amplitude of the detected shaking is larger.

7. The apparatus according to claim 3, wherein the determination unit performs the determination processing using different thresholds according to a frequency of the detected shaking in a case where the control unit executes the control of the pan drive unit or the tilt drive unit based on the detected shaking.

8. The apparatus according to claim 7, wherein the determination unit performs the determination processing using a larger threshold as the frequency of the detected shaking is higher.

9. The apparatus according to claim 1, wherein the determination unit performs the determination processing based on a difference between a turn angle of the pan drive unit or the tilt drive unit which is instructed by the control unit and an actual turn angle of the pan drive unit or the tilt drive unit.

10. The apparatus according to claim 9, wherein the determination unit determines that the turn angle of the pan drive unit or the tilt drive unit is not normal in a case where a state in which the difference is higher than or equal to a predetermined threshold has continued for a predetermined period of time.

11. The apparatus according to claim 10, wherein the determination unit changes the predetermined threshold or the predetermined period of time according to whether or not the control unit executes the control of the pan drive unit or the tilt drive unit based on the detected shaking.

12. The apparatus according to claim 10, wherein the determination unit reports the positioning error in a case where it is determined that the turn angle of the pan drive unit or the tilt drive unit is not normal.

13. A method for controlling an apparatus, the method comprising:
controlling a pan drive unit or a tilt drive unit to change a capturing direction of a pickup unit;
detecting shaking to the pickup unit; and
performing determination processing for determining whether or not a turn angle of the pan drive unit or the tilt drive unit is normal, wherein the determination processing is performed according to whether or not the control of the pan drive unit or the tilt drive unit based on the detected shaking is executed.

14. The method according to claim 13, further comprising:
performing the determination processing in a case where the control unit does not does no execute the control of the pan drive unit or the tilt drive unit based on the detected shaking.

15. The method according to claim 13, further comprising:
executing the determination processing using different thresholds according to whether or not the controlling executes the control of the pan drive unit or the tilt drive unit based on the detected shaking.

16. The method according to claim 13, further comprising:
performing the determination processing based on a difference between a turn angle of the pan drive unit or the tilt drive unit which is instructed by the control unit and an actual turn angle of the pan drive unit or the tilt drive unit.

17. A non-transitory computer-readable storage medium storing a program for causing a computer to execute a method comprising:
controlling a pan drive unit or a tilt drive unit to change a capturing direction of a pickup unit;
detecting shaking to the pickup unit; and
performing determination processing for determining whether or not a turn angle of the pan drive unit or the tilt drive unit is normal, wherein
the determination processing is performed according to whether or not the control of the pan drive unit or the tilt drive unit based on the detected shaking is executed.

18. The non-transitory computer-readable storage medium according to claim 17, further comprising: performing the determination processing in a case where the control unit does not execute the control of
the pan drive unit or the tilt drive unit based on the detected shaking.

19. The non-transitory computer-readable storage medium according to claim 17, further comprising:
executing the determination processing using different thresholds according to whether or not the controlling executes the control of the pan drive unit or the tilt drive unit based on the detected shaking.

20. The non-transitory computer-readable storage medium according to claim 17, further comprising:
performing the determination processing based on a difference between a turn angle of the pan drive unit or the tilt drive unit which is instructed by the control unit and an actual turn angle of the pan drive unit or the tilt drive unit.

* * * * *